Nov. 8, 1955 F. J. PARRINGTON 2,722,854
PNEUMATIC DRILL UNIT
Filed Nov. 5, 1954 4 Sheets-Sheet 1
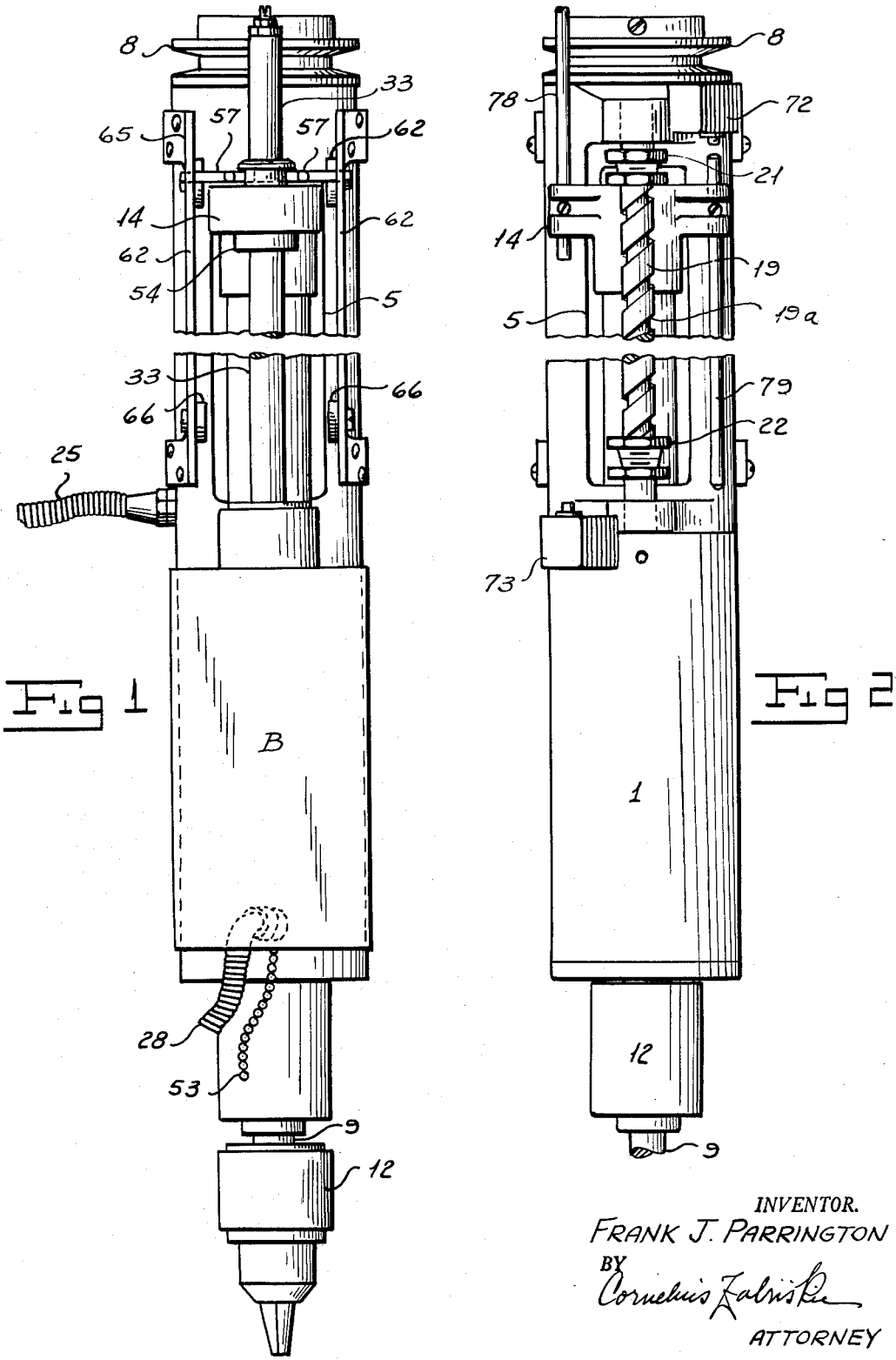
INVENTOR.
FRANK J. PARRINGTON
BY
Cornelius Zabriskie
ATTORNEY

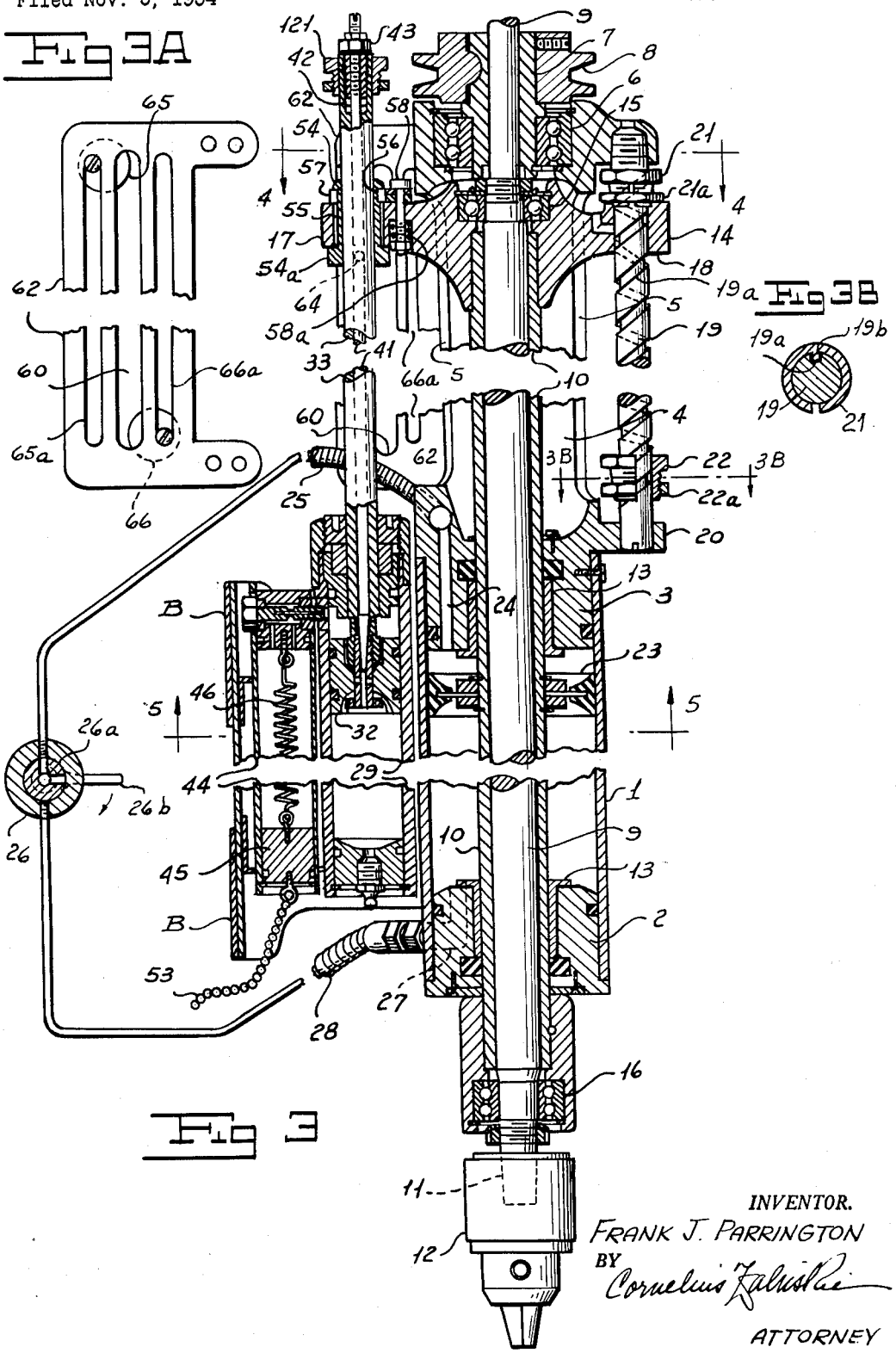

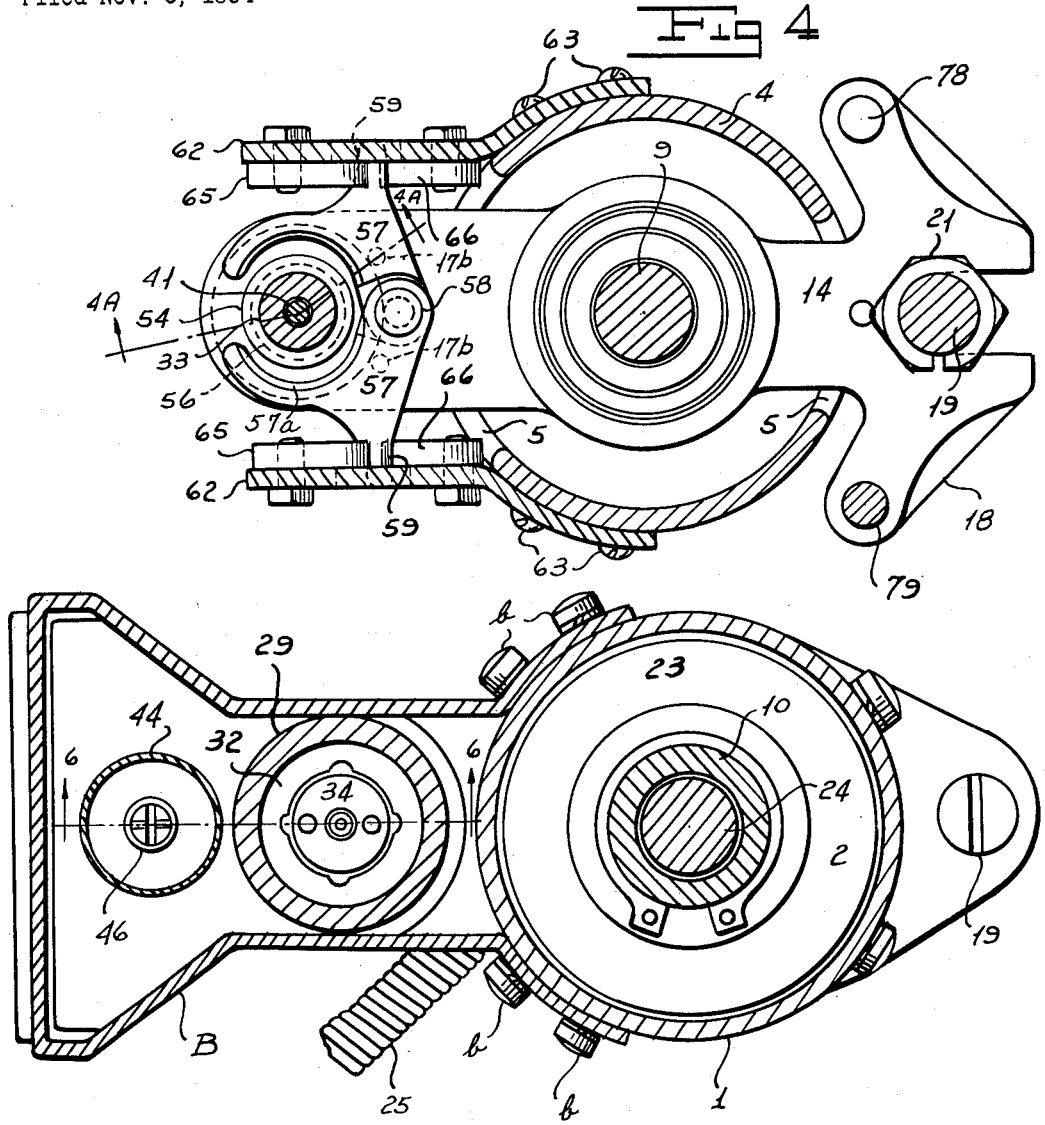
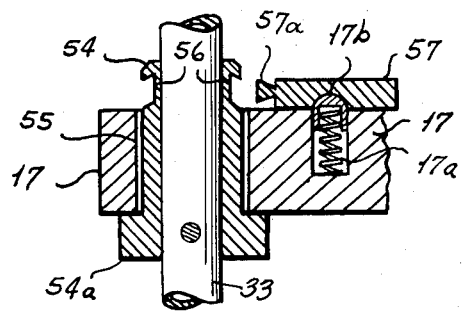

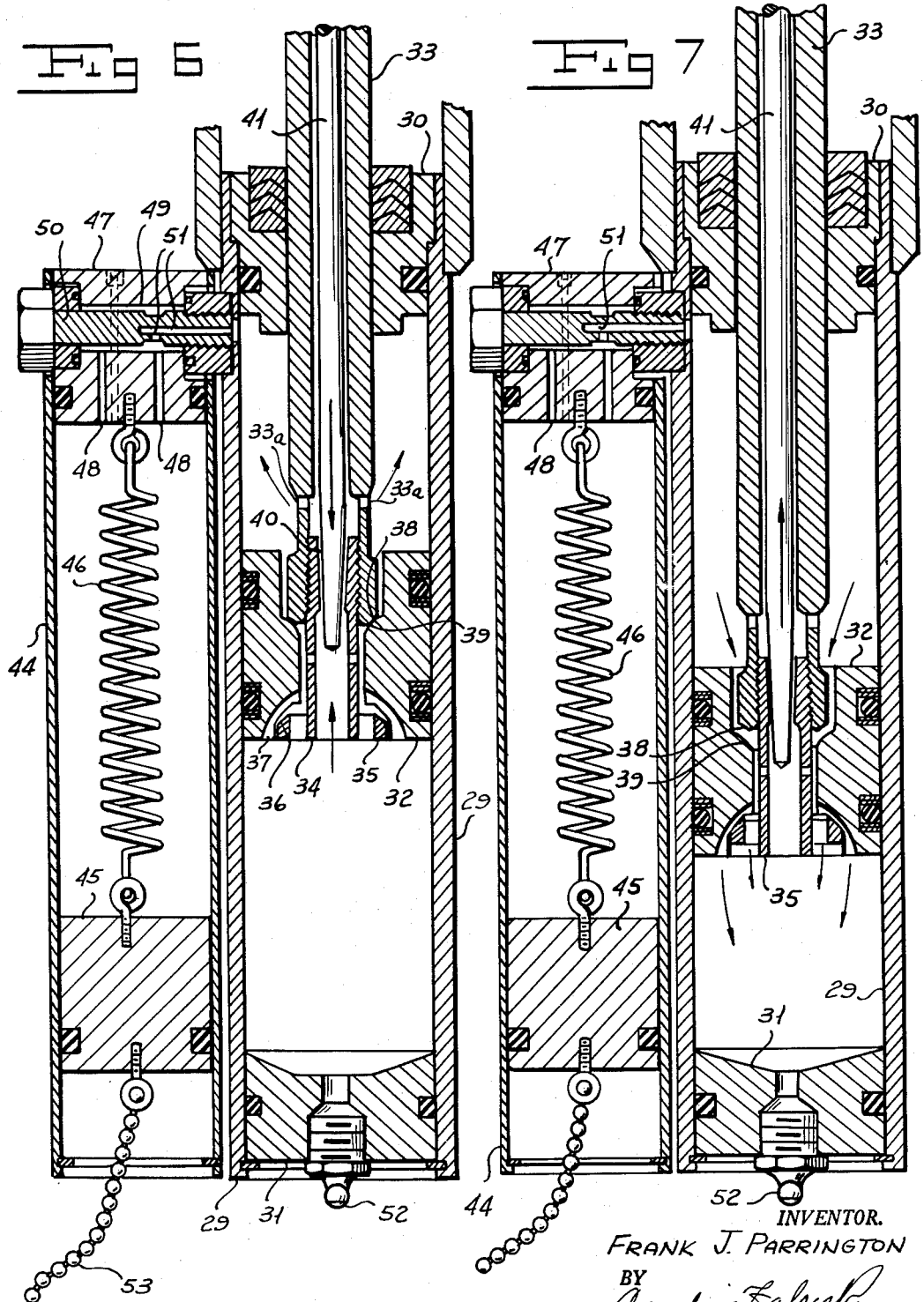

United States Patent Office 2,722,854
Patented Nov. 8, 1955

2,722,854
PNEUMATIC DRILL UNIT

Frank J. Parrington, New York, N. Y., assignor to Alkon Products Corporation, Hawthorne, N. J., a corporation of New York Application November 5, 1954, Serial No. 467,108

3 Claims. (Cl. 77—32.3)

This invention relates to that class of drill unit wherein the tool carrying spindle is moved to and from work by air pressure.

The primary object of the invention is to provide such a drill unit wherein the feed of the spindle to the work is accurately metered and so constituted that the unit may operate in a fully automatic manner for straight drilling, or step drilling, selectively, at such speeds as will most efficiently carry out the desired operations in a minimum of elapsed operating time.

A further object of the invention is to produce a unit of the character described which will have small overall dimensions so as to operate on close centers as a production tool and so constituted that accessories, such as tapping attachments, multiple spindle drill heads, saw attachments, automatic die heads, and the like can be readily fixed to the quill or spindle to be operated thereby.

Another object of the invention is to so associate the parts of the structure as to eliminate bending stresses on the quill and spindle and to adequately provide for radial thrust.

A further object of the invention is to provide an efficient production unit well adapted to meet exacting requirements of accuracy in operation and adapted to perform the work to which it is applied in a highly efficient, expeditious manner, without loss or idle motion and without requiring close attention or constant manipulation by the operator.

Another object of the invention is to produce a machine wherein the actual cutting operations are carried out at predetermined regulable metered cutting feeds, while intermediate operations are performed at relatively high speed, so as to minimize lapse of production time.

Speaking generally, the unit of the present invention comprises a pneumatic cylinder having therein a piston secured to a coaxial quill in the latter of which is rotatable a driven spindle to one end of which is affixed a chuck or other appropriate means for supporting a drill or other cutting tool. The spindle is adapted to be driven at a constant speed, while the quill and spindle are reciprocated through the admission of compressed air into the cylinder at the opposite sides of the piston.

Mounted at one side of a pneumatic cylinder is a metering device comprising a hydraulic cylinder having therein a piston, the stem of which may be locked to the quill during the feed of the tool to its work and unlocked from the quill during the return stroke of the latter so that the speed of the work stroke may be retarded and controlled while the return stroke may be unretarded and rapid. The speed of the work stroke may be regulated through adjustment of a metering pin which regulates the flow of liquid in the hydraulic cylinder from one side of the piston to the other and through the adjustment of this metering pin a very efficient control of the feed of the tool carried by the quill may be accomplished, while the free operation of the pneumatic piston on its return stroke effects a saving of considerable overall time in production work.

The invention includes automatically operable means adapted, when properly regulated or adjusted, to lock the hydraulic piston to the yoke or disengage it from the yoke at such times as may be appropriate for straight drilling or step drilling, as may be the case.

In addition to these features, means is provided for maintaining an adequate supply of hydraulic liquid in the hydraulic cylinder in an entirely automatic manner, so as to require little attention by the operator in this connection.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is an end view of the unit looking from the left hand side of Fig. 3.

Fig. 2 is a like view looking from the right hand side of Fig. 3.

Fig. 3 is a central transverse section through the unit.

Fig. 3A shows a cam mounting bracket detached from the unit.

Fig. 3B is a fragmental section on the line 3B—3B of Fig. 3.

Fig. 4 is a section on the line 4—4 of Fig. 3.

Fig. 4A is a section on the line 4A—4A of Fig. 4.

Fig. 5 is a section on the line 5—5 of Fig. 3.

Fig. 6 is an enlarged section on the line 6—6 of Fig. 5, illustrating the hydraulic metering system of this invention, with the parts illustrated in the positions which they occupy when the hydraulic piston is moving downwardly.

Fig. 7 is a view like unto Fig. 6, but showing the relation of the parts when the hydraulic piston is moving upwardly.

Referring to the drawings, 1 designates a pneumatic cylinder closed at its bottom by a lower cylinder head 2 and at its top by an upper cylinder head 3. The upper cylinder head is surmounted by an integral skeletonized tubular body 4, preferably in the form of a casting, the opposite sides of which are cut away to provide openings 5. The upper portion of this body supports a bearing 6 in which a sleeve 7 is mounted to rotate and to this sleeve is keyed a pulley 8 adapted to be driven by a V-belt from an electric motor or any other appropriate source of power although any other appropriate drive may be used.

The sleeve 7 is locked against rotation to the upper end portion of a spindle 9. This spindle extends downwardly through a cylindrical quill 10 and is provided at its lower end with a tapered portion 11 on which may be mounted a tool or tool holder, such as a chuck 12, which is adapted to grip a drill, tap or the like. The rotation imparted to the pulley 8 is transmitted through the spindle to the chuck 12.

The quill is supported for sliding movement through the upper and lower cylinder heads by bearings with packings 13, while its upper end extends into and is fixed within a yoke 14. An upper bearing 15 is interposed between the yoke and the spindle 9 and, with a lower bearing 16, serves to firmly support the spindle for rotation. The yoke 14 has two laterally extending arms 17 and 18 which project through the openings 5 in the side of the body 4.

The arm 18 is provided with an opening through which extends a guide rod 19, the lower end of which is supported by a lug 20 on the upper cylinder head 3, while the upper end of said rod is tapped into a lateral projection formed on the upper portion of the body. This rod 19 is arranged parallel to the axis of the spindle and is locked against longitudinal movement. The yoke slides up and down on this rod which is provided with adjustable stops 21 and 22 to limit the upper and lower termini of movement of the quill and spindle. The stops 21 and 22 are in the form of split bushings externally threaded to receive clamping nuts, 21a, 22a, so that said stops may be adjusted longitudinally of the rod 19 to meet the requirements of the work to be performed, as hereinafter described.

It will be noted from Figs. 3 and 3B that the guide rod 19 is provided with a helical groove 19a extending throughout its length while each of the split bushings 21 and 22 has an internal tooth 19b. These teeth fit within the groove 19a, as shown best in Fig. 3B, and serve to provide a firmer anchorage of the bushings in fixed positions when the nuts thereon are tightened. When this groove and tooth arrangement is employed, the bushings will not be shifted even when sharply engaged by the yoke at the opposite ends of travel of the latter. Since the guide rod 19 is rigidly supported on both its upper and lower ends and operates through the yoke with a fairly close sliding fit, it will serve to guide the yoke during reciprocations of the spindle in such manner as to eliminate radial thrust which might tend to distort both the spindle and quill and the hydrocheck.

Mounted in fixed position upon the quill and located within the cylinder is a piston 23 adapted to be reciprocated by the introduction of compressed air into the cylinder above and below said piston. This air is introduced above the piston through a duct 24 fed by a flexible connection 25 which leads from a control valve 26 having a rotatable core 26a operable by a handle 26b. Air is fed into the other end of the cylinder through a duct 27 and a flexible connection 28 which also leads to the control valve 26. Through the operations of the valve handle, the air is alternately fed to the respective sides of the piston to reciprocate the quill and spindle to and from the work operated upon.

Positioned at one side of the pneumatic cylinder and parallel thereto is a hydraulic cylinder 29. This cylinder is shown on an enlarged scale in Figs. 6 and 7. The upper end of the hydraulic cylinder is closed by a gland seat 30, while its lower end is closed by a plug 31. Both the seat and plug are provided with appropriate packing, so as to seal both ends of the cylinder against leakage of oil contained therein.

Positioned in the cylinder 29 is a hydraulic piston 32 provided with a stem 33 which is slidable through the gland seat 30. This stem is tubular in form and its lower end is threaded to receive a fitting 34 with the lower end of which is integrally formed a spider 35. The upper edge of the spider is chamfered, as shown at 36, and coacts with a series of radical ribs 37 formed in a chamber in the bottom of the hydraulic piston 32. The lower end of the step 33 is chamfered to form a circumferential valve 38 adapted to engage with a transversely convex circular seat 39 at the base of a recess in the upper portion of the piston 32. The valve 38 and its convex seat insure proper sealing against the flow of liquid when they are engaged with one another, even though they may be slightly out of axial alinement.

When this valve 38 engages with the seat 39, it serves to seal the portion of the cylinder above the piston from the portion of the cylinder below the same. The spacing between the valve 38 and the top of the spider 35 is such as to permit the valve to be lifted from engagement with the seat 39 before the chamfered end of the spider engages the radial ribs 37, in which event, liquid may by-pass the stem and fitting through the space thus provided in the piston.

The upper portion of the fitting 34 is in the form of a tapered orifice 40, with which cooperates the lower tapered end of a metering pin 41. This pin projects upwardly through the tubular stem 33 and is threaded at its upper end to operate through a tapped bushing 42. Through rotation of the metering pin, the open area between the tapered end of the pin and the orifice 40 may be controlled. When properly regulated, the metering pin is locked in position by a lock nut 43 (see Fig. 3).

With this arrangement, it will be manifest that downward movement of the piston stem 33 will tend to force the piston downwardly and cause the valve 38 to engage the seat 39, thereby precluding the flow of liquid between the valve and its seat, so that any liquid passing the piston 32 must pass through the venturi opening formed by the tapered orifice 40 and about the tapered end of the metering pin 41, to enter the upper chamber of the cylinder through the openings 33a. However, if the piston stem 33 is drawn upwardly, the valve 38 will be lifted from its seat 39 and liquid will be free to pass from the upper chamber of the cylinder downwardly through the central passage of the piston into the lower chamber.

The hydraulic cylinder is adapted to contain oil in sufficient amount to completely fill the chambers in the cylinder both above and below the piston and, in order to insure this condition at all times, a supply chamber 44 is mounted next to the hydraulic cylinder. This supply chamber is tubular in form, is closed at both ends and is provided therein with a plunger 45 biased by a spring 46 so that it tends to elevate. The plug 47 which seals the top of the chamber is provided with ducts 48 leading to a transverse passage 49 in which is positioned a threaded stud 50 having passages 51 to feed oil from the chamber 44 into the upper chamber of the hydraulic cylinder 29.

In initially charging the hydraulic cylinder, oil is introduced through a valved inlet 52 from any appropriate source of supply and in sufficient quantity to fill the hydraulic cylinder, both above and below the piston, and to also fill the chamber 34. This oil is introduced (with the piston 32 at the bottom of its stroke) under such pressure as to depress the plunger 45 and force it to substantially the lower end of this chamber and when enough oil has been introduced to accomplish this result, the hydraulic system of this device is fully charged.

During the subsequent operation of the unit, any oil which may leak from the hydraulic cylinder 29 will be replaced from the chamber 44 for the spring 46 will maintain the oil in said cylinder under sufficient pressure to replenish the hydraulic cylinder as and when this is required. The chamber 44 also acts as a compensator to receive such oil from the hydraulic cylinder 29 as may be displaced by the piston stem 33 when the hydraulic piston 32 is at the bottom of its stroke.

A chain 53, shown as attached to the lower end of the plunger 45, is for indicating purposes and it may lead to a suitable audible or visual signal or alarm which it is adapted to operate when the oil in the chamber 44 has been exhausted.

The tubular hydraulic piston stem 33 extends upwardly and passes through what I term a "memory collar" 54, adapted at certain stages in the operation of the unit to seat within an opening 55 in the arm 17 of the yoke. This memory collar has a cylindrical portion adapted to be received into the opening 55 of the yoke, but below this cylindrical portion is formed an annular flange 54a, the upper face of which forms an abutment to seat against the under side of that arm of the yoke, as clearly shown in Fig. 3. As further shown in this figure, the collar is provided above the arm of the yoke with a circumferential channel 56 and with this channel is adapted to be engaged and disengaged by a pair of finger latches 57, shown in Figs. 4 and 4A.

In order to insure a more positive engagement between the finger latches and the groove 56 of the memory collar, the upper edge of said groove is preferably undercut as shown in Fig. 4A and the cooperating margins of each of the finger latches are made of dove-tail configuration as illustrated at 57a in this figure. When these margins are entered into the circumferential groove 56, a more positive engagement results which will preclude the inadvertent disengagement of the parts until the finger latches are positively withdrawn by engagement of the trunnions 59 with cams 66, presently described.

The two finger latches are mounted on a common pivot 58 carried by the arm 17 of the yoke and each latch is provided with a trunnion 59. These trunnions extend in opposite directions to one another and project into slots 60 formed in cam mounting brackets 62, one of which is shown in detail in Fig. 3A. These cam mounting brackets are mounted on the body 5 of the unit, as shown in Fig. 4, and may be conveniently held in place by screws 63, as shown in this figure.

The memory collar 54 is fixed to the hydraulic piston stem 33 by a pin 64 or in any other appropriate manner and, when the finger latches are in engagement with the circumferential channel 56 of the collar, as shown in Fig. 4, the collar and stem 33 will be locked to the yoke, so that the reciprocations of the pneumatic piston 32 will be accompanied by corresponding travel of the hydraulic piston, and the latter will then control the speed of operation of the pneumatic piston and consequent operation of the spindle as it is fed to and from the work. However, if the finger latches are rotated in opposite directions, to swing the parts thereof which engage with the channel 56 free from said channel, the memory collar 54 and the hydraulic piston stem 33 on which it is mounted will no longer be responsive to the movements of the yoke and the yoke and spindle may be operated independently of the hydraulic check within the limits between the upper terminus of movement of the yoke and the downward movement of the yoke until it engages the flange at the lower end of said collar.

The adjustment of the finger latches into and out of engagement with the circumferential channel 15 of the memory collar is accomplished by latch operating cams 65 and 66 shown best in Figs. 3A and 4. These cams are mounted respectively at the upper and lower ends of the slots 65a and 66a formed in the cam mounting brackets 62 and they are adjustable longitudinally of these slots, so as to overlap the intermediate slot 60 of each cam mounting bracket 62 (Fig. 3A). As shown in these figures, all of these slots are parallel to one another and to the axis of the hydraulic piston stem 33. This arrangement places the cams 65 in such position that, as the spindle is reciprocated, carrying with it the memory collar 54, the trunnions 59 of the finger latches will vertically traverse the slots 60 of the brackets and, as they reach the upper ends of the slots 60, they will engage with the latch operating cams 65 and such engagement will cause the finger latches to be swung on the pivot 58 into an unlocked position, i. e., out of the channel 56 of the memory collar. When the spindle descends, the finger latches will move downwardly with it until the trunnions 59 engage with the latch operating cams 66 which will move the finger latches into engagement with the channel 56 of the memory collar, so that the hydraulic piston stem will be locked to the spindle for movement in both directions therewith.

In Fig. 3A the latch operating cams 65 and 66 are shown as positioned at their maximum distances apart which is slightly less than the maximum throw of the spindle. However, these cams may be adjusted longitudinally of the slots 65a and 66a in accordance with the particular work to be performed as hereinafter described.

In the operation of the finger latches, it is essential that, when moved into either of the positions described, they will remain in such position until positively shifted therefrom. To this end, the bolt 38, which forms a pivot for these latches, is preferably provided at the under side of the yoke with a spring 58a acting against the nut of the bolt to impart friction between the finger latches and the yoke and, in addition thereto, the upper face of the yoke is provided, beneath finger latch, with a pocket 17a shown in Fig. 4A, containing a spring acting against a plunger 17b. These plungers press against the under side of the finger latches and in the unlocked position of these latches enter into detents in the latches to positively lock them in retracted position. However, when the trunnions 59 are engaged by the cams 66, the use of the cams will overcome the locking action of the plungers and permit the finger latches to move into engagement with the memory collar.

The apparatus thus far described operates as follows:

It may be assumed that the pneumatic piston 23 is at the upper terminus of its stroke as shown in Fig. 3. This upper terminus is controlled by the stop 21 which may be adjusted longitudinally of the rigid rod 19 and locked in any desired position by the clamping nut 21a. At this time the upper cam 65 will be in such adjustment that the finger latches will be in retracted position and the memory collar will be unlocked from the yoke. The core 26a of the pneumatic control valve 26 is in position to open communication between a source of compressed air and the lower end of the pneumatic cylinder through the connection 28. The work is placed beneath a tool, such as a drill, held in the chuck 20 on the spindle, and the unit is ready to start operation.

The operating member or handle 26b of the valve 26 may now be operated, either automatically under appropriate automatic controls or by hand, to shift the valve core into position shown in Fig. 3 to shut off the feed of compressed air through the connection 28 and feed it through the connection 25 into the upper chamber of the pneumatic cylinder. When this occurs, the pneumatic piston is forced downwardly, carrying with it the tool to its work and, as it descends, it carries with it the yoke, the arm of which is engaged with the flange 54a of the collar 5a fixed on the piston stem 33 of the hydraulic piston 32. The hydraulic piston and the pneumatic piston are thus tied together to move in unison and the hydraulic piston serves as a check on the speed of the pneumatic piston and controls the speed of feed of the tool to the work.

During the descent of the hydraulic piston under the impulse of its piston stem, the valve 38 of the hydraulic piston stem 33 engages with the seat 39 with the result that the liquid in the lower chamber of the hydraulic cylinder is caused to pass through the metered venturi 40 and enter the upper chamber of said cylinder through the openings 33a. By adjusting the metering pin 41 the rate of feed may be accurately controlled.

The pneumatic piston continues to feed the tool in the manner described and in some cases this feed may, if desired, be continuous. However, in practice it is generally preferred to feed for a predetermined distance, then withdraw the tool and then again advance the tool to its work, so that the complete boring operation is carried out through a succession of incremental boring steps. This is the preferred and accepted practice. In the form of the invention shown this so-called "step drilling" is controlled manually. That is to say, the operator reverses the operations of the handle 26b of the pneumatic valve 26 after the initial step in the boring operation has been carried as far as he desires or as may be prescribed and, when the feed of compressed air is reversed as stated, the pneumatic piston will immediately be retracted.

However, since the memory collar is not at this time locked to the hydraulic piston, the hydraulic piston stem will remain in its advanced position and the pneumatic piston will elevate without conjoint movement of the hydraulic piston. Consequently the retractive speed of the pneumatic piston will be rapid and appreciable time will be saved over that which would be expended if the hydraulic piston had to move with the pneumatic piston during the retractive stroke of the latter.

After the pneumatic piston has reached the upper end of its stroke, the operator then again reverses the feed of compressed air so that the pneumatic piston is again fed to its work. During the initial portion of the travel of that feed, the piston is unimpeded and this condition continues until the tool reaches the bottom of the portion of the hole already bored, at which time the arm 17 of the yoke will engage with the flange 54a of the memory collar 54 and from that time on during this particular step of boring the operation will be carried out under the timing action of the hydraulic piston for the two pistons will be locked together during this period.

The foregoing operation of alternately reversing the feed of compressed air to the opposite sides of the pneumatic piston will bring about step boring, with each cumulative step of boring under control of the hydraulic piston, so that the speed of boring the hole may be maintained uniform during each successive boring step until the aggregate required depth is obtained. When this has been attained, it is desirable that the tool remain at the desired depth for a predetermined time while it continues to rotate in order that the bottom of the hole may be cleaned smooth and accuracy of depth assured. The depth is assured by the accurate setting of the stop 22 and, when the arm 18 of the yoke engages this stop, the tool can descend no further.

After the hole has been thoroughly cleaned to the precise desired depth, the valve 26 is operated manually or otherwise to retract the pneumatic piston to its original position and the parts come to rest in this latter position to permit movement of the work for the boring of the next hole or holes, as the case may be.

It is frequently desirable to so adjust the unit that, when the boring operation is completed, the hydraulic piston will be locked to the yoke, so as to be retracted with the pneumatic piston. When this is desired, the lower cam 66 is so adjusted as to engage with the trunnions 59 of the locking latches 57 at about the time that the tool reaches the desired depth. When thus adjusted, the cam 66, through engagement with such trunnions, will cause the finger latches to engage with the channel 56 in the memory collar with the result that both pistons will be retracted together. In this connection it should be noted that the upper cams 65 may also be adjusted to disengage the finger latches from the memory collar after the pistons have been only partially retracted, so that, for the remainder of the retractive stroke of the pneumatic piston, it may move further free of restraint by the hydraulic piston. In this way, the distance of free stroke of the pneumatic piston for the next cycle may be predetermined.

I have hereinbefore described the operation of the unit as controlled through the manual manipulation of the handle 26b. However, this handle may be automatically controlled, electrically or otherwise, without departing from this invention, for the present invention is not primarily directed to automatic control. However, the pins 78 and 79, shown as adjustably mounted on the arm 18 of the yoke, are intended for the control of switches when electrical control is employed.

In the foregoing detailed description an apparatus has been shown which is peculiarly efficient in step drilling. There are, however, instances where step drilling is not required and apparatus embodying some of the novel features described are unessential for practical purposes. In such cases, the upper end of the memory collar is altered, as by cutting it off flush with the upper surface of the arm 17 of the yoke and there is adjustably mounted on the stem 33 above the yoke arm 17 a stop 121 similar to the stop 21, as indicated in Fig. 3. The finger latches are also removed when the machine is to be operated in this manner. This arrangement is useful where the clearance of chips is not a problem and the drilling of the hole of full desired depth may be accomplished in one complete stroke.

In either embodiment of the invention which I have described, the hydraulic check operates in the same way so far as its checking operation is concerned. That is to say, when the hydraulic piston is forced downwardly by the stem 33 and its valve 38 is engaged with the seat 39, as in Fig. 6, the only communication between the lower and upper chambers of the hydraulic cylinder is through the venturi 40, the area of which may be regulated by the metering pin 41, so as to accurately control the rate of feed to and during the work cycle. However, when the hydraulic piston is elevated by its stem 33, as shown in Fig. 7, the valve 38 is unseated and liquid in the upper chamber of the hydraulic cylinder is free to by-pass the piston into the lower chamber through the axial passage of said piston with practically no retarding action upon the pneumatic piston.

The hydro-check, which has been hereinbefore described as associated with a pneumatic piston, quill and spindle of a drill press, has many uses in connection with apparatus other than a drill unit such as described. In fact, it may be used in any environment where it is desired to control the rate of speed in one direction with free travel in the opposite direction. In these latter uses, the yoke 14 of the present embodiment may constitute any movable part of the apparatus, the speed of movement of which it is desired to control. For example, if it is desired to control the forward speed of a milling machine table, a part of the table or a projection thereon would correspond to the yoke 14. Similarly the feed of a circular saw to the work piece may be controlled in like manner. My hydro-check may also be used to control the speed of impact presses and broaching machines where the movable parts, the speed of which is to be controlled, would correspond to the yoke 14, although manifestly such parts might be of entirely different shape. For these reasons, I wish it understood that the hydro-check cooperating with and controlling a movable part as described is within the broad aspects of this invention.

The unit of this invention embodies a number of novel features, all of which are preferably combined in the complete unit to produce a structure of outstanding efficiency. However, I am aware that some of these features may be employed without necessarily employing all. For the reasons given, the invention is to be understood as not limited to the specific details hereinbefore enumerated, but is to be construed as fully commensurate with the appended claims.

Having thus fully described the invention, what I claim as new and desire to secure by Letters Patent is:

1. A drill unit comprising: a pneumatic cylinder, an axially movable quill coaxial of said cylinder and extending beyond both ends thereof, a pneumatic piston fixed to the quill within the cylinder, a rotary tool operating spindle extending through the quill, and a yoke rigid with the quill, in combination with a hydraulic check embodying a hydraulic cylinder rigid with the pneumatic cylinder and having therein a hydraulic piston with a tubular stem extending through one end of the hydraulic cylinder into cooperative relation with the yoke, there being a constricted passage between the chambers at the opposite sides of the hydraulic piston, a memory collar locked to the hydraulic piston stem and having an abutment engaging with the side of the yoke contiguous to the hydraulic piston and at the opposite side of the yoke a circumferential channel, a finger latch on the yoke to be engaged with and disengaged from the channel of said collar, and finger latch operating means in the path of the finger latch for controlling the operations of the latter.

2. A drill unit according to claim 1, wherein two oppositely operating finger latches are adapted to cooperate with the circumferential channel in the memory collar.

3. A drill unit according to claim 1, wherein the finger latch operating means comprises a cam mounting bracket rigid with both cylinders and carrying manually adjustable cams for engaging and disengaging the finger latch on the yoke from the memory collar on the stem at predetermined points in the travel of the yoke.

References Cited in the file of this patent

UNITED STATES PATENTS

| | | |
|---|---|---|
| 2,604,759 | Smith | July 29, 1952 |
| 2,657,595 | Shaff | Nov. 3, 1953 |

FOREIGN PATENTS

| | | |
|---|---|---|
| 198,473 | Great Britain | Jan. 7, 1923 |